United States Patent
Etsion et al.

(10) Patent No.: US 11,175,922 B1
(45) Date of Patent: Nov. 16, 2021

(54) COARSE-GRAIN RECONFIGURABLE ARRAY PROCESSOR WITH CONCURRENT HANDLING OF MULTIPLE GRAPHS ON A SINGLE GRID

(71) Applicant: SPEEDATA LTD., Even Yehuda (IL)

(72) Inventors: Yoav Etsion, Atlit (IL); Dani Voitsechov, Atlit (IL); Evgeni Krimer, Haifa (IL); Jonathan Friedmann, Even Yehuda (IL)

(73) Assignee: SPEEDATA LTD., Haifa (IL)

( * ) Notice: Subject to any disclaimer, the term of this patent is extended or adjusted under 35 U.S.C. 154(b) by 0 days.

(21) Appl. No.: 16/889,159

(22) Filed: Jun. 1, 2020

Related U.S. Application Data (63) Continuation-in-part of application No. 16/860,070, filed on Apr. 28, 2020.

(51) Int. Cl.
  *G06F 9/38* (2018.01)
  *G06F 13/40* (2006.01)

(52) U.S. Cl.
  CPC ........ *G06F 9/3836* (2013.01); *G06F 13/4027* (2013.01)

(58) Field of Classification Search
  CPC .......................... G06F 9/3836; G06F 13/4027
  See application file for complete search history.

(56) References Cited

U.S. PATENT DOCUMENTS

| | | |
|---|---|---|
| 8,615,770 B1 | 12/2013 | Stratton et al. |
| 10,579,390 B2 | 3/2020 | Etsion et al. |
| 2003/0115352 A1 | 6/2003 | Picraux |
| 2004/0003220 A1 | 1/2004 | May et al. |
| 2005/0071835 A1 | 3/2005 | Essick et al. |
| 2007/0300214 A1 | 12/2007 | Chang et al. |
| 2010/0122105 A1 | 5/2010 | Arslan et al. |
| 2013/0187932 A1 | 7/2013 | Malakapalii et al. |
| 2013/0198757 A1 | 8/2013 | Kim et al. |
| 2013/0247054 A1 | 9/2013 | Schmidt et al. |
| 2013/0328890 A1 | 12/2013 | Avkarogullari et al. |
| 2016/0314175 A1 | 10/2016 | Dhayapule et al. |
| 2017/0046138 A1 | 2/2017 | Stanfill et al. |

(Continued)

OTHER PUBLICATIONS

Podlozhnyuk, "Image convolution with CUDA", NVIDIA, Technical Report, pp. 1-21, Jun. 2007.

(Continued)

*Primary Examiner* — Farley Abad
(74) *Attorney, Agent, or Firm* — Kligler & Associates Patent Attorneys Ltd (57) ABSTRACT

A processor includes a compute fabric and a controller. The compute fabric includes an array of compute nodes and interconnects that configurably connect the compute nodes. The controller is configured to receive at least first and second different Data-Flow Graphs (DFGs), each specifying code instructions, and to configure at least some of the compute nodes and interconnects in the compute fabric to concurrently execute the code instructions specified in the first and second DFGs, and send to the compute fabric multiple first threads that execute the code instructions specified in the first DFG and multiple second threads that execute the code instructions specified in the second DFG, thereby causing the compute fabric to execute, at least during a given time interval, both code instructions specified in the first DFG and code instructions specified in the second DFG.

22 Claims, 3 Drawing Sheets

(56) References Cited

U.S. PATENT DOCUMENTS

| | | |
|---|---|---|
| 2017/0228319 A1 | 8/2017 | Mueller et al. |
| 2018/0101387 A1 | 4/2018 | Etsion et al. |
| 2019/0004878 A1 | 1/2019 | Adler et al. |
| 2019/0102179 A1 | 4/2019 | Fleming et al. |
| 2019/0102338 A1 | 4/2019 | Tang et al. |
| 2019/0303153 A1 | 10/2019 | Halpern et al. |
| 2019/0324888 A1 | 10/2019 | Evans et al. |
| 2020/0004690 A1 | 1/2020 | Mathew et al. |
| 2020/0159539 A1 | 5/2020 | Etsion et al. |

OTHER PUBLICATIONS

NVIDIA, "CUDA Samples", Reference Manual, TRM-06704-001, verson 11.1, pp. 1-142, Oct. 2020 downloaded from http://developer.download.nvidia.com/compute/cuda/sdk/website/samples.html.

NVIDIA, "CUDA Programming Guide v7.0", RN-06722-001, pp. 1-21, Mar. 2015 downloaded from http://developer.download.nvidia.com/compute/cuda/7_0/Prod/doc/CUDA_Toolkit_Release_Notes.pdf.

Patt et al., "HPS, a new microarchitecture: rationale and introduction", ACM SIGMICRO, pp. 103-108, Dec. 1985.

Lattner et al., "LLVM: A compilation framework for lifelong program analysis & transformation", International Symposium on Code Generation and Optimization, pp. 1-11, Mar. 20-24, 2004.

Nowatzki et al., "Exploring the potential of heterogeneous von neumann/dataflow execution models", 2015 ACM/IEEE 42nd Annual International Symposium on Computer Architecture (ISCA), pp. 1-13, Portland, USA, Jun. 13-17, 2015.

Ho et al., "Efficient execution of memory access phases using dataflow specialization", 2015 ACM/IEEE 42nd Annual International Symposium on Computer Architecture (ISCA), pp. 1-13, Jun. 13-17, 2015.

Nowatzki et al., "Stream-dataflow acceleration," ISCA '17: Proceedings of the 44th Annual International Symposium on Computer Architecture, pp. 416-429, Toronto, Canada, Jun. 24-28, 2017.

Van Den Braak et al., "R-gpu: A reconfigurable gpu architecture," ACM Transactions on Architecture and Code Optimization, vol. 13, No. 1, article 12, pp. 1-24, Mar. 2016.

"MPI: A message-passing interface standard," version 3.1, pp. 1-868, Jun. 2015.

Agarwal et al., "The MIT alewife machine: Architecture and performance", ISCA '95: Proceedings of the 22nd annual international symposium on Computer architecture, pp. 2-13, May 1995.

Sanchez et al., "Flexible architectural support for fine-grain scheduling", ASPLOS Conference, pp. 1-12, Pittsburgh, USA, Mar. 13-17, 2010.

Voitsechov et al., "Control flow coalescing on a hybrid dataflow/von Neumann GPGPU," Intl. Symp. on Microarchitecture (MICRO-48), pp. 1-12, year 2015.

Campanoni et al., "HELIX-RC: An architecture-compiler co-design for automatic parallelization of irregular programs", 2014 ACM/IEEE 41st International Symposium on Computer Architecture (ISCA), pp. 1-12, Jun. 14-18, 2014.

Srinath et al., "Architectural specialization for inter-iteration loop dependence patterns", Proceedings of the 47th International Symposium on Microarchitecture (MICRO-47), pp. 1-13, Dec. 2014.

Rangan et al., "Decoupled software pipelining with the synchronization array", Proceedings of 13th International Conference on Parallel Architecture and Compilation Techniques (PACT), pp. 1-13, Jan. 2004.

AMD, ""Vega" Instruction Set Architecture", Reference guide, pp. 1-247, Jul. 28, 2017.

HSA Foundation, "HSA Programmer's Reference Manual: HSAIL Virtual ISA and Programming Model, Compiler Writer's Guide, and Object Format (BRIG)", Publication #: 49828, revision version 0.95, pp. 1-358, May 1, 2013.

Karp et al., "Properties of a Model for Parallel Computations: Determinacy, Termination, Queueing", SIAM Journal on Applied Mathematics, vol. 14, No. 6, pp. 1390-1411, Nov. 1966.

Wang et al., "CAF: Core to Core Communication Acceleration Framework", PACT '16, pp. 351-362, Haifa, Israel, Sep. 11-15, 2016.

Voitsechov et al., "Single-Graph Multiple Flows: Energy Efficient Design Alternative for GRGPUs", ISCA '14 Proceeding of the 41st annual international symposium on Computer architecture, pp. 205-216, Oct. 16, 2014.

Arvind et al. "Executing a program on the MIT tagged-token dataflow architecture", IEEE Transactions on Computers, vol. 39, No. 3, pp. 300-318, Mar. 1990.

Bakhoda et al., "Analyzing CUDA Workloads Using a Detailed GPU Simulator", IEEE International Symposium on Performance Analysis of Systems and Software (ISPASS-2009), pp. 163-174, Apr. 26-28, 2009.

Callahan et al.,"Adapting Software Pipelining for Reconfigurable Computing", Proceedings of internationalConference on Compilers, Architecture, and Synthesis for Embedded Systems, pp. 57-64, year 2000.

Che et al., "Rodinia: A Benchmark Suite for Heterogeneous Computing", Proceedings of the IEEE International Symposium on Workload Characterization (IISWC), pp. 44-54, Oct. 2009.

Culler et al., "Two fundamental limits on dataflow multiprocessing", Proceedings of the IFIP Working Group 10.3 (Concurrent Systems) Working Conference on Architectures and Compilation Techniques for Fine and Medium Grain Parallelism, pp. 153-164, Jan. 1993.

Cytron et al., "Efficiently computing static single assignment form and the control dependence graph", ACM Transactions on Programming Languages and Systems, vol. 13, No. 4, October, pp. 451-490, year 1991.

Dennis et al., "A preliminary architecture for a basic data flow processor", IISCA '75 Proceedings of the 2nd annual symposium on Computer architecture, pp. 125-131, year 1975.

Ei-Amawy et al., "Properties and performance of folded hypercubes", IEEE Transactions on Parallel and Distributed Systems, vol. 2, No. 1, pp. 31-42, Jan. 1991.

Franklin et al., "ARB: A Hardware Mechanism for Dynamic Reordering of Memory References", IEEE Transactions an Computers, vol. 45, issue 5, 552-571, May 1996.

Goldstein et al., "PipeRench: A Reconfigurable Architecture and Compiler", IEEE Computer, vol. 33, Issue 4, pp. 70-77, Apr. 2000.

Govindaraju et al., "Dynamically Specialized Datapaths for Energy Efficient Computing", 17th IEEE International Symposium on High Performance Computer Architecture, pp. 503-514, Feb. 2011.

Gupta et al., "Bundled execution of recurring traces for energy-efficient general purpose processing", International Symposium on Microarchitecture (MICRO), pp. 12-23, Dec. 3-7, 2011.

Gurd et al., "The Manchester prototype dataflow computer", Communications of the ACM—Special section on computer, vol. 28, Issue 1, p. 34-52, Jan. 1985.

Hameed et al., "Understanding sources of inefficiency in general-purpose chips", International Symposium on Computer Architecture (ISCA), pp. 37-47, Jun. 19-23, 2010.

Hind et al., "Pointer analysis: haven't we solved this problem yet?", ACM SIGPLAN-SIGSOFT Workshop on Program Analysis for Software Tools and Engineering, pp. 54-61, Jun. 18-19, 2001.

Hong et al., "An Integrated GPU Power and Performance Model", International Symposium on Architecture (ISCA), pp. 280-289, Jun. 19-23, 2010.

Hormati et al., "Sponge: Portable Stream Programming on Graphics Engines", International Symposium on Architecture, Support for Programming Languages & Operating Systems (ASPLOS), pp. 381-392, Mar. 5-11, 2011.

Huang et al., "Elastic CGRAs", Proceedings of the ACM/SIGDA International symposium on Field programmable gate arrays (FPGA'13), pp. 171-180, Feb. 11-13, 2013.

Isci et al., "Runtime power monitoring in high-end processors: Methodology and empirical data", International Symposium on Microarchitecture (MICRO), pp. 93-104, Dec. 2003.

Keckler et al., "Life after Dennard and how I learned to love the picojoule", The 44th Annual IEEE/ACM International Symposium on Microarchitecture, Conference keynote (abstract—1 page), year 2011.

(56) References Cited

OTHER PUBLICATIONS

Keckler et al., "GPU's and the Future of Parallel Computing", IEEE Micro, vol. 31, issue 5, pp. 7-17, Sep.-Oct. 2011.
Khailany et al., "Imagine: Media Processing With Streams", IEEE Micro, vol. 21, pp. 35-46, 2011.
Lee et al., "Space-Time Scheduling of Instruction-Level Parallelism on a Raw Machine", ASPLOS VIII Proceedings of the eighth international conference on Architectural support for programming languages and operating systems, pp. 46-57, year 1998.
Leng et al., "GPUWattchy : Enabling Energy Optimizations in GPGPUs", International Symposium on Architecture (ISCA), pp. 487-498, year 2013.
Lindholm et al., "NVIDIA Tesla: A Unifies Graphics and Computing Architecture", IEEE Micro, vol. 28, No. 2, pp. 39-55, year 2008.
Mishra et al., "Tartan: Evaluating Spatial Computation for Whole Program Execution", ASPLOS XII Proceedings of the 12th international conference on Architectural support for programming languages and operating systems, pp. 163-174, Oct. 21-25, 2006.
Nickolls et al., "Scalable Parallel Programming with CUDA on Manycore GPUs", ACM Queue, vol. 6, No. 2, pp. 40-53, Mar.-Apr. 2008.
Nickolls et al., "The GPU computing era", IEEE Micro, vol. 30, No. 2, pp. 56-69, year 2010.
NVIDIA, "NVIDIA's Next Generation CUDATM Compute Architecture", FermiTM, Version 1.1, 22 pages, Oct. 2, 2009.
NVIDIA., "NVIDIA Tegra 4 family CPU architecture: 4-PLUS-1 quad core", 19 pages, 2013.
Khronos OpenCL Working Group, "The OpenCL Specification", Version 1.0, Document Revision 48, Oct. 6, 2009.
Ballance et al., "The program dependence web: a representation supporting control-, data-, and demand-driven interpretation of imperative languages", ACM SIGPLAN'90 Conference on Programming Language Design and Implementation, pp. 257-271, Jun. 20-22, 1990.
Papadopoulos et al., "Monsoon: An Explicit Token-Store Architecture", 25 years of the International Symposium on Computer architecture (selected papers) (ISCA '98), pp. 74-76, year 1998.
Russel, R., "The Cray-1 Computer System", Communications of ACM, vol. 21, No. 1, pp. 63-72, January Jan. 1978.
Sankaralingam et al., "Exploiting ILP, TLP, and DLP with the Polymorphous TRIPS Architecture", Proceedings of the 30th International Symposium on Computer Architecture (ISCA), pp. 422-433 , year 2003.
Smith et al., "Dataflow Predication", Proceedings of the 39th Annual IEEE/ACM International Symposium on Microarchitecture, pp. 89-102, year 2006.
Swanson et al., "WaveScalar", Proceedings of the 36th International Symposium on Microarchitecture, 12 pages, Dec. 2003.
Taylor et al., "The Raw Microprocessor: A Computational Fabric for Software Circuits and General-Purpose Programs", IEEE Micro, vol. 22, No. 2, pp. 25-35, year 2002.
Thies et al., "StreamIt: A Language for Streaming Applications", Proceedings of the 11th International Conference on Compiler Construction, pp. 179-196, Apr. 2002.
Tullsen et al., "Simultaneous Multithreading: Maximizing On-Chip Parallelism", Proceedings of the 22nd Annual International Symposium on Computer Architecture (ISCA), pp. 392-403 , Jun. 1995.
Yamamoto., "Performance Estimation of Multis treamed, Superscalar Processors", Proceedings of the 27th Annual Hawaii International Conference on System Sciences, vol. 1, pp. 195-204, year 1994.
Li et al., "McPAT: An Integrated Power, Area, and Timing Modeling Framework for Multicore and Manycore Architectures", 42nd Annual IEEE/ACM International Symposium on Microarchitecture (MICRO'09), pp. 469-480, Dec. 12-16, 2009.
Shen et al., "Modern Processor Design: Fundamentals of Superscalar Processors", Computer Science, pp. 2002.
Voitsechov et al., U.S. Appl. No. 16/860,070, filed Apr. 28, 2020.
U.S. Appl. No. 16/860,070 Office Action dated Sep. 29, 2021.
International Application # PCT/IB2021/052104 Search Report dated Jun. 7, 2021.
International Application # PCT/IB2021/052105 Search Report dated May 31, 2021.

COARSE-GRAIN RECONFIGURABLE ARRAY PROCESSOR WITH CONCURRENT HANDLING OF MULTIPLE GRAPHS ON A SINGLE GRID

CROSS-REFERENCE TO RELATED APPLICATIONS

This application is a continuation-in-part of U.S. patent application Ser. No. 16/860,070, filed Apr. 28, 2020, whose disclosure is incorporated herein by reference.

FIELD OF THE INVENTION

The present invention relates generally to processor architectures, and particularly to Coarse-Grain Reconfigurable Array (CGRA) processors.

BACKGROUND OF THE INVENTION

Coarse-Grain Reconfigurable Array (CGRA) is a computing architecture in which an array of interconnected computing elements is reconfigured on demand to execute a given program. Various CGRA-based computing techniques are known in the art. For example, U.S. Patent Application Publication 2018/0101387, whose disclosure is incorporated herein by reference, describes a GPGPU-compatible architecture that combines a coarse-grain reconfigurable fabric (CGRF) with a dynamic dataflow execution model to accelerate execution throughput of massively thread-parallel code. The CGRA distributes computation across a fabric of functional units. The compute operations are statically mapped to functional units, and an interconnect is configured to transfer values between functional units.

SUMMARY OF THE INVENTION

An embodiment of the present invention that is described herein provides a processor including a compute fabric and a controller. The compute fabric includes an array of compute nodes and interconnects that configurably connect the compute nodes. The controller is configured to receive at least first and second different Data-Flow Graphs (DFGs), each specifying code instructions, and to configure at least some of the compute nodes and interconnects in the compute fabric to concurrently execute the code instructions specified in the first and second DFGs, and send to the compute fabric multiple first threads that execute the code instructions specified in the first DFG and multiple second threads that execute the code instructions specified in the second DFG, thereby causing the compute fabric to execute, at least during a given time interval, both code instructions specified in the first DFG and code instructions specified in the second DFG.

In some embodiments, at least in a given clock cycle of the compute fabric, one or more compute nodes execute code instructions specified in the first DFG and one or more other compute nodes execute code instructions specified in the second DFG. In some embodiments, at least during the given time interval, one or more of the compute nodes switch from execution of code instructions specified in the first DFG to execution of code instructions specified in the second DFG.

In a disclosed embodiment, a first compute node in the compute fabric is configured to switch-over from the first DFG to the second DFG at a first time, and a second compute node in the compute fabric is configured to switch-over from the first DFG to the second DFG at a second time, different from the first time. In an example embodiment, a given compute node is configured to switch-over from the first DFG to the second DFG in response to completing processing all the threads associated with the first DFG. In an embodiment, the controller is configured to send to one or more of the compute nodes a control signal that permits the compute nodes to switch-over from the first DFG to the second DFG, and a given compute node in the compute fabric is configured to switch-over from the first DFG to the second DFG not before receiving the control signal.

In another embodiment, a given compute node, which participates in executing the code instructions specified in the first DFG but does not participate in executing the code instructions specified in the second DFG, is configured to self-deactivate in response to completing processing all the threads associated with the first DFG. Additionally or alternatively, the controller may be configured to activate a given compute node, which does not participate in executing the code instructions specified in the first DFG but participates in executing the code instructions specified in the second DFG.

In some embodiments, the controller is configured to instruct the compute nodes synchronously to alternate between at least the first and second DFGs. In other embodiments, a given compute node is configured to autonomously schedule alternation between at least the first and second DFGs. In an example embodiment, the given compute node is configured to receive first input tokens by communicating with one or more first compute nodes that precede the given compute node in accordance with the first DFG, to receive second input tokens by communicating with one or more second compute nodes that precede the given compute node in accordance with the second DFG, and to execute the first input tokens and the second input tokens in accordance with the scheduled alternation between the first and second DFGs.

There is additionally provided, in accordance with an embodiment of the present invention, a computing method including, in a processor that includes a compute fabric including an array of compute nodes and interconnects that configurably connect the compute nodes, receiving at least first and second different Data-Flow Graphs (DFGs), each specifying code instructions. At least some of the compute nodes and interconnects in the compute fabric are configured to concurrently execute the code instructions specified in the first and second DFGs. Multiple first threads that execute the code instructions specified in the first DFG, and multiple second threads that execute the code instructions specified in the second DFG, are sent to the compute fabric, thereby causing the compute fabric to execute, at least during a given time interval, both code instructions specified in the first DFG and code instructions specified in the second DFG.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and devices for Coarse-Grain Reconfigurable Array (CGRA) computing. An example CGRA-based processor comprises a coarse-grain compute fabric, and a controller that configures and controls the compute fabric. The compute fabric comprises (i) an array of compute nodes and (ii) interconnects that configurably connect the compute nodes.

The controller receives compiled software code, also referred to as a software program, which is represented as a Data-Flow Graph (DFG). The controller configures the compute nodes and the interconnects in accordance with the DFG, thereby configuring the fabric to execute the program. The controller then sends to the compute fabric multiple threads, which the fabric executes in accordance with the DFG in a pipelined manner.

Multiple threads typically execute the same code, as represented by the DFG, on different data. (Strictly speaking, different threads differ slightly from one another in that they depend on the thread number, e.g., in specifying different memory addresses from which to fetch the different data. Nevertheless, in the present context such threads are regarded herein as executing the same code. While different threads execute the same static code, dynamic execution may differ from one thread to another due to differences in data.)

In many practical cases, however, the software program is far too large to be mapped onto the compute fabric in its entirety. Therefore, in some embodiments of the present invention, the software program provided to the controller is represented as a set of interconnected DFGs, rather than as a single DFG. Each DFG specifies code instructions that perform a respective portion of the program. Each DFG has a single input and one or more exits. The DFGs are interconnected in accordance with a predefined interconnection topology that follows the high-level flow control of the program. This structure is typically provided by a compiler. Note that, even when the compute fabric is large enough to map the entire code, there may be other reasons for dividing the code into multiple DFGs, e.g., due to branches.

In the disclosed embodiments, the controller comprises a scheduler that schedules execution of the various DFGs on the fabric in time alternation. When a certain DFG is scheduled, the scheduler "maps the DFG onto the fabric," i.e., configures at least some of the compute nodes and interconnects in the fabric to execute the code instructions specified in the DFG. The scheduler sends to the fabric multiple threads for execution, and the fabric executes the threads in accordance with the DFG, typically beginning with reading initial values for the various threads from memory. During the execution of the threads on the currently-scheduled DFG, the fabric saves the results of the various threads to memory, and the scheduler reconfigures the fabric to execute the next DFG. Scheduling, reconfiguration and execution proceeds in this manner until all threads complete executing the software program, or until the controller decides to suspend processing for any reason.

Further aspects of running multiple threads on a CGRA fabric are addressed in U.S. Patent Application Publication 2018/0101387 and U.S. patent application Ser. No. 16/860,070, both cited above and incorporated herein by reference.

In some embodiments of the present invention, the CGRA processor, including the compute fabric and the controller, is configured to concurrently execute instructions belonging to multiple different DFGs. The disclosed techniques refer to concurrent handling of multiple different DFGs, as opposed to multiple replicas of the same DFG that may run concurrently on different sets of CNs. Hybrid cases, in which the fabric concurrently handles multiple different DFGs, one or more of which having multiple replicas, are also supported. The different DFGs may belong to the same software program or to different programs or tasks, e.g., different database queries. Different programs or tasks may be associated with the same user or with different users.

In the present context, the phrase "concurrent execution of code instructions specified in multiple different DFGs" refers to the compute fabric as a whole, and not necessarily to each individual compute node. In some embodiments that are described herein, the fabric switches-over from one DFG to another progressively. In these embodiments, during a certain transition interval, one or more compute nodes execute instructions specified in the current DFG, while at the same time (e.g., same clock cycle) one or more other compute nodes execute instructions specified in another DFG that has threads ready for execution. Gradual switch-over is highly effective in reducing the high latency overhead, which would otherwise be incurred by switching from one DFG to another.

In other embodiments, one or more of the compute nodes in the fabric alternate (e.g., from one clock cycle to the next) between execution of instructions specified in two or more different DFGs. This technique provides improved processing efficiency and throughput, since the compute-node resources are utilized more efficiently.

System Description

Figure 1:
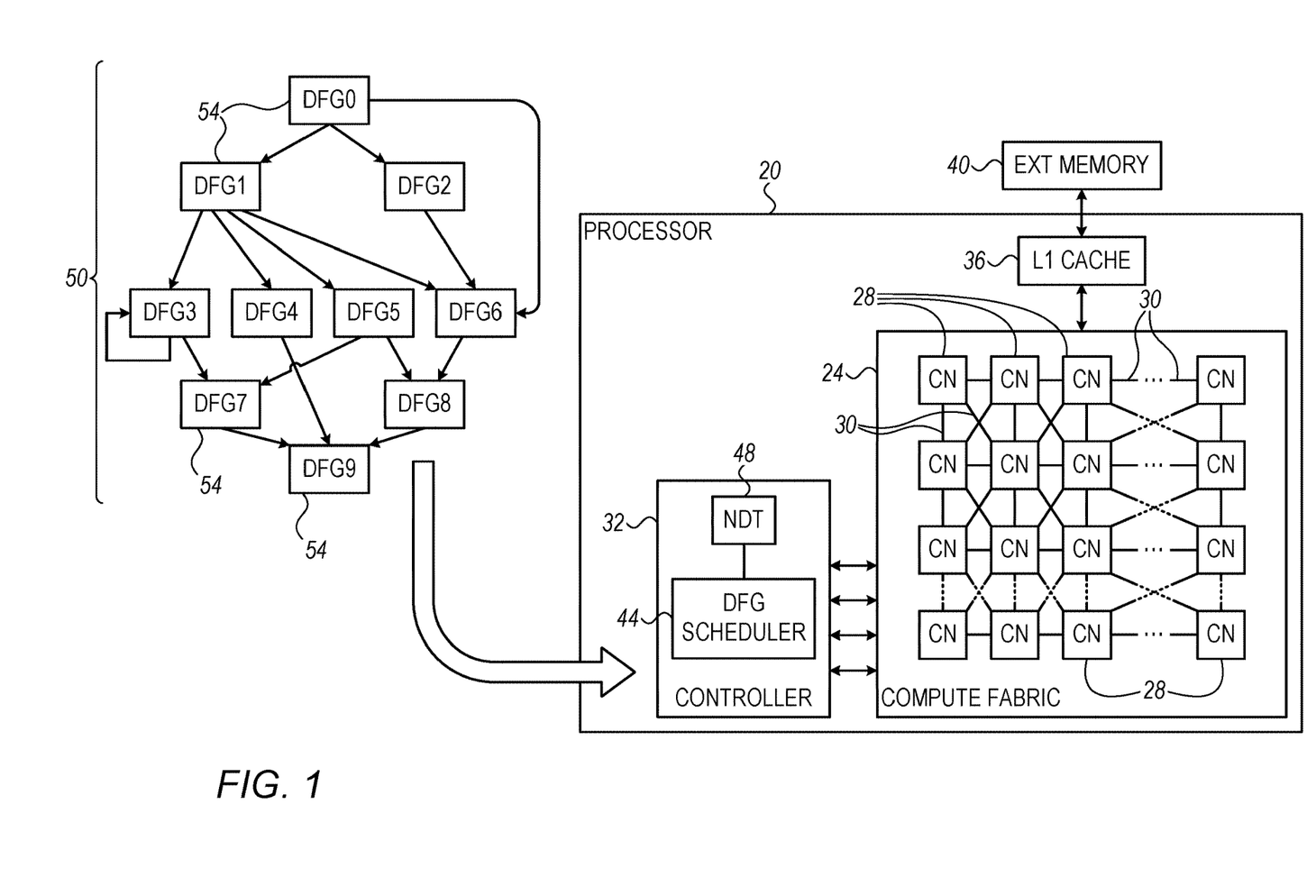
FIG. 1 is a block diagram that schematically illustrates a Coarse-Grain Reconfigurable Array (CGRA) processor, in accordance with an embodiment of the present invention.

FIG. 1 is a block diagram that schematically illustrates a Coarse-Grain Reconfigurable Array (CGRA) processor 20, in accordance with an embodiment of the present invention. Processor 20 is based on a reconfigurable compute fabric 24, which comprises multiple Compute Nodes (CNs) 28 arranged in an array. CNs 28 are also referred to simply as "nodes" for brevity. In an example embodiment, fabric 24 has a total of 256 CNs 28, arranged in a 16-by-16 array, although any other suitable number and arrangement of CNs can be used.

CNs 28 in fabric 24 are connected to one another using interconnects 30, for transferring data and control information (referred to as "tokens") between CNs. In the present embodiment, each CN 28 comprises a switch (not seen in FIG. 1, examples shown in FIGS. 2 and 3 below) that is configurable to connect the CN with one or more selected neighboring CNs. In some embodiments, CNs 28 may send and/or receive additional control information, e.g., configurations and/or exceptions. Such information may be transferred over separate interconnections, e.g., a control network that is separate from interconnects 30. See, for example, the interconnects labeled "TO/FROM CONTROLLER" in FIGS. 2 and 3 below.

Processor 20 further comprises a Level-1 (L1) cache 36 (or, alternatively, a multi-level cache), which is connected to an external memory 40 and to fabric 24. Cache 36 and external memory 40 are referred to collectively as the memory system of the processor. At least some of CNs 28 in fabric 24 are configured to store data in the memory system and to load data from the memory system.

Figure 2:
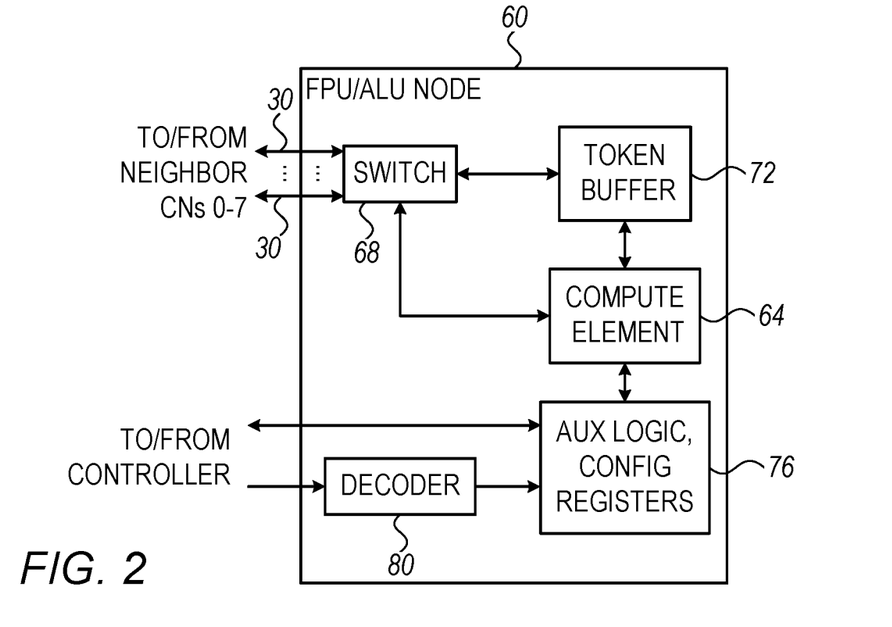
FIG. 2 is a block diagram that schematically illustrates an FPU/ALU node in the CGRA processor of FIG. 1, in accordance with an embodiment of the present invention.
Figure 3:
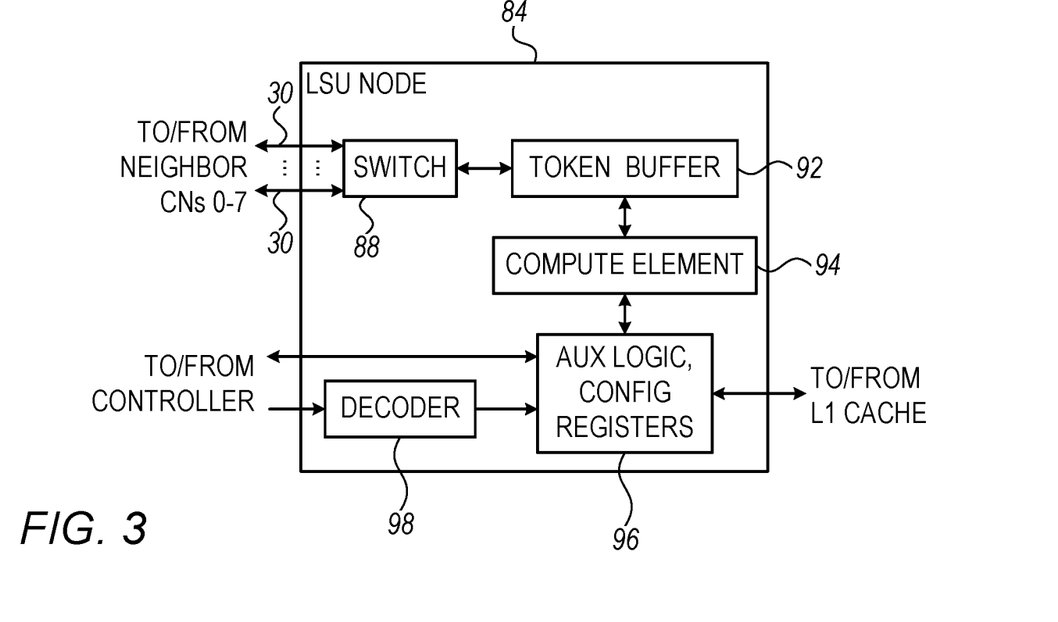
FIG. 3 is a block diagram that schematically illustrates an LSU node in the CGRA processor of FIG. 1, in accordance with an embodiment of the present invention.

In some embodiments, all CNs 28 in fabric 24 are similar in structure. In other embodiments, fabric 24 comprises CNs of two or more different types. FIGS. 2 and 3 below show examples of a Floating Point Unit/Arithmetic Logic Unit (FPU/ALU) CN that is configured to perform mathematical computations, and a Load-Store Unit (LSU) CN that is configured to perform memory load and store operations. In some embodiments, the LSU CNs are located along the perimeter of fabric 24, in order to simplify their interconnection to the memory system. FPU/ALU CNs may be located at any suitable locations in fabric 24. Other types of CNs, not discussed in detail herein, may comprise control CNs, and CNs that perform high-complexity computations such as division or square-root computations.

Processor 20 further comprises a controller 32 that, among other functions, configures fabric 24 to carry out desired computational tasks. Controller 32 typically configures the functionality of each CN, and the interconnection topology between CNs. Controller 32 typically configures fabric 24 by sending control registers to CNs 28 over the control network.

Controller 32 typically receives a compiled version of the software code, produced by a suitable compiler. The compiled code comprises a representation of the software code as a structure 50 of interconnected Data Flow Graphs (DFGs) 54. Each DFG 54 represents a respective section of the code, and has a single entry point and one or more exit points. Each DFG is a directed graph, in which vertices represent code instructions and arcs represent the data flow between instructions. An exit point of a DFG (e.g., a conditional or unconditional branch, a function call or a return from a function, etc.) comprises an instruction that leads to an input of a (different or the same) DFG, or terminates the program.

In order to execute a given DFG, controller 32 configures selected CNs 28, and the interconnections between them, to execute the code instructions and the flow-control specified in the DFG. This operation is also referred to as "mapping the DFG onto the fabric."

A typical DFG begins with readout of initial values (live values) and possibly data from the memory system, then proceeds to perform a sequence of instructions that process the data and possibly store it, and ends with storage of the live values. Generally, however, loading of values from memory (both live values and data) and/or storage of values to memory may be performed at any stage of the DFG, not necessarily at the beginning/end. In an example implementation, controller 32 configures the fabric to execute such a DFG by assigning one or more LSU CNs to read the initial values, assigning appropriate CNs (e.g., FPU/ALU CNs) to execute the instructions specified in the DFG, and assigning one or more LSU CNs to store the results. Controller 32 also configures the switches of one or more CNs, in order to interconnect the CNs according to the flow specified in the DFG. Examples of such configurations can be found in U.S. Patent Application Publication 2018/0101387 and U.S. patent application Ser. No. 16/860,070, both cited above and incorporated herein by reference.

Once configured with a given DFG, fabric 24 is able to execute multiple threads, each thread performing the instructions of the given DFG on different data, in a pipelined manner. In such a pipelined operation, a given CN executes the same instruction in the DFG (with different arguments), for different threads. As soon as the CN completes execution of the instruction for one thread, it is ready to execute it for the next thread. Typically, different threads process different data since load instructions that load data for the thread specify addresses that depend on the thread ID.

Typically, the size of fabric 24 is not sufficient for executing the entire structure 50, i.e., all DFGs, simultaneously. Thus, in some embodiments, controller 32 comprises a DFG scheduler 44 that schedules execution of the various DFGs 54 in time alternation. Scheduler 44 schedules the DFGs using a data structure referred to as a Next DFG Table (NDT) 48. The operation of scheduler 44, and the various data structures used for scheduling, are described in detail in U.S. patent application Ser. No. 16/860,070.

FIG. 2 is a block diagram that schematically illustrates an FPU/ALU node 60, in accordance with an embodiment of the present invention. The configuration of node 60 can be used for implementing at least some of CNs 28 in fabric 24 of CGRA processor 20 of FIG. 1.

FPU/ALU node 60 comprises a compute element 64, a switch 68 and a token buffer 72. Switch 68 is configured to connect node 60 to one or more selected neighbor CNs in fabric 24, for receiving input tokens from neighbor CNs and for sending output tokens to neighbor CNs. Input tokens may comprise, for example, data and meta-data (control information) from neighbor CNs to be used as operands in the computation of node 60. Output tokens may comprise, for example, results of the computation of node 60 that are provided to neighbor CNs for subsequent processing. Input and output tokens may also comprise control information.

In the present example, node 60 can be connected to any of eight nearest neighbor CNs 28 in fabric 24, denoted CN0 . . . CN7. As such, node 60 has eight interconnects 30 connected to switch 68. Alternatively, any other suitable interconnection topology can be used.

Token buffer 72 is configured to store input tokens that were received from neighbor CNs and are pending for processing, and/or output tokens that were processed and are pending for outputting to neighbor CNs. Compute element 64 comprises the circuitry that performs the computations of node 60, e.g., an FPU, an ALU, or any other suitable computation.

Consider a scenario in which controller 32 configures fabric 24 to execute a certain DFG 54. As part of this configuration, FPU/ALU node 60 is assigned to execute a certain code instruction in the DFG. To perform this role, controller 32 configures compute element 64 to perform the computation specified in the instruction, e.g., an addition or multiplication. Controller 32 also configures switch 68 to connect the appropriate interconnects 30 to the CNs that supply inputs to the code instruction and consume the result of the code instruction. This switch may also be configured to transfer values to other CNs without going through compute element 64.

In the present example, node 60 further comprises auxiliary logic 76 and a decoder 80. Auxiliary logic 76 comprises configuration registers that hold the configuration parameters of switch 68 and compute element 64, as configured by controller 32. In addition, auxiliary logic 76 may perform functions such as communication with controller 32, interrupt handling, counters management and the like.

In a typical configuration process, controller 32 sends to FPU/ALU node 60 one or more instructions that configure the configuration registers in auxiliary logic 76. Decoder 80 decodes the instructions received from controller 32, and configures the configuration registers accordingly. As will be explained below, in some embodiments node 60 comprises dual configuration registers (also referred to as "shadow registers") for enabling fast switch-over between DFGs.

FIG. 3 is a block diagram that schematically illustrates an LSU node 84, in accordance with an embodiment of the present invention. The configuration of node 84 can be used for implementing at some of CNs 28 in fabric 24 of CGRA processor 20 of FIG. 1.

LSU node 84 is configured to execute load and store instructions, i.e., load data from memory 40 via cache 36, and store data to memory 40 via cache 36. As noted above, LSU nodes are typically located along the perimeter of fabric 24, to simplify their interconnection to the memory system.

LSU node 84 comprises a switch 88, a token buffer 92 and a decoder 98, which are similar in structure and functionality to switch 68, buffer 72 and decoder 80 of FPU/ALU node 60, respectively. Node 84 additionally comprises a compute element 94 that is used, for example, for memory address computations. Node 84 further comprises auxiliary logic 96, which performs functions such as communication with controller 32, communication with L1 cache 36, storage of configuration registers, interrupt handling, counters management, NDT update, as well as initiator and terminator functions (to be explained below).

In alternative embodiments, initiator and terminator functions may be implemented in separate CNs, not in LSU nodes 84. Thus, in the present context, the terms "initiator" and "terminator" refer to any CN that performs initiator and terminator functions, respectively. Initiator and terminator functions may be implemented in dedicated CNs, or combined with other functions in the same CN, e.g., in an LSU node.

In some embodiments, when mapping a given DFG onto fabric 24, scheduler 44 may deactivate (e.g., power-off) one or more of CNs 28 that do not participate in executing the code instructions specified in the given DFG, in order to reduce power consumption. The scheduler may deactivate only parts of a CN, e.g., only a switch (e.g., switch 68 or 88) or only a compute element (e.g., element 64 or 94).

In some embodiments, when configuring fabric 24 to execute a certain DFG, scheduler 44 configures the fabric with multiple replicas of the DFG that will run concurrently. This feature is useful, for example, for DFGs that are considerably smaller than the fabric. In these embodiments, the DFG replicas execute the same section of the program, but are mapped to different subsets of CNs 28. In particular, each replica of the DFG has its own initiator and terminator nodes.

The configurations of CGRA processor 20, FPU/ALU node 60 and LSU node 84, and their various components, as shown in FIGS. 1-3, are example configurations that are depicted purely for the sake of conceptual clarity. In alternative embodiments, any other suitable configurations can be used. Additional aspects of multi-threaded CGRA processors are addressed in U.S. Patent Application Publication 2018/0101387 and in U.S. patent application Ser. No. 16/860,070, cited above.

In various embodiments, processor 20 and its elements may be implemented using any suitable hardware, such as in an Application-Specific Integrated Circuit (ASIC) or Field-Programmable Gate Array (FPGA). In some embodiments, some of the elements of processor 20, e.g., controller 32, may be implemented using a programmable processor that is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Initiator and Terminator Operation

In some embodiments, each of the LSU nodes in fabric 24 (e.g., node 84 of FIG. 3) can serve as an initiator or as a terminator. In other embodiments, the initiators and terminators are implemented as dedicated CNs. An initiator is a CN that begins execution of threads in a DFG. A terminator is a CN that completes execution of threads in a DFG.

An initiator typically receives thread batches from scheduler 44 for execution. The initiator then computes the Thread IDs (tid's) for the initiated threads and sends the tid's to its successor CNs 28 in fabric 24 (one after another). Upon receiving a tid, each CN 28 executes its configured computation, and forwards the result to the next CN according to the DFG. Thus, each tid travels through fabric 24 as a data token.

Typically, a thread batch is communicated between scheduler 44 and the initiator as a (Thread_batch_id, Thread_batch_bitmap, Thread_set_ID) tuple. When a thread batch arrives in an initiator, the initiator analyzes the bitmap to identify the Thread IDs it should initiate (e.g., by adding the indices of the set bits in the bitmap to Thread_batch_ID). To avoid stalls, the initiator may use prefetching and double buffering ("shadowing") of thread batches. Whenever a thread batch is received, the initiator immediately requests the next thread batch from scheduler 44.

When an entire thread set completes execution on the present DFG (or when the scheduler decides to end the thread set for some reason, e.g., to perform context switch), i.e., when the scheduler has no remaining thread batches to send, the initiator sends a "final token" down the fabric. This token is not permitted to bypass any other tokens. The final token is sent to all replicas of the DFG, and is used by terminator nodes for verifying that the thread set is completed.

A terminator executes the final branch instruction that exits the present DFG. In the disclosed embodiments, each exit point from a DFG is implemented as a branch instruction, referred to herein as an "exit branch" for brevity. The target address of an exit branch is the start address of the next DFG. An exit branch may be a conditional or unconditional branch instruction. An exit branch may be, for example, a direct branch instruction, an indirect branch instruction, a predicated branch instruction, or a "thread halt" instruction. A DFG may comprise any suitable number of exit points, possibly a single exit point. An exit branch can be located anywhere in the DFG, not necessarily the last instruction.

For exit branches implemented as direct branches, the identities of the successor DFGs are indicated to the terminator node when it is initially configured (as part of configuring the fabric to execute the present DFG). At runtime, the input token (or tokens) to the terminator node, or the terminator node itself, determines the successor DFG according to the branch condition. The successor DFG is determined per thread, depending on the outcome (taken/not taken) of the branch condition for each thread. In an embodiment, the terminator node holds four 64-bit bitmaps. As the threads of the batch complete execution, the terminator node gradually constructs a pair of 64-bit bitmaps, one bitmap for each possible successor DFG (one bit map for each possible outcome of the branch decision).

When all the threads in the batch completed execution, the terminator node holds two bitmaps. In one bitmap, the set bits indicate the threads for which the successor DFG corresponds to the "taken" outcome. In the other bitmap, the set bits indicate the threads for which the successor DFG corresponds to the "not taken" outcome.

When the next batch of thread begins execution, the terminator node uses the other pair of 64-bit bitmaps. This mechanism enables the terminator to return to the first pair of bitmaps in case of out-of-order thread batches. If another batch of threads arrives (i.e., a new address) the terminator updates the least-recently used 64-bit bitmap in the NDT.

For exit branches implemented as indirect branches, the terminator node typically calculates the target addresses of the successor DFGs at runtime using the above-described mechanism. The terminator node computes the address of each successor DFG and updates the relevant 64-bit bitmap. Once a new 64-bit bitmap is needed (e.g., when the present batch of threads is a new batch, or when the successor DFG is different) the terminator node updates the least-recently used 64-bit bitmap in the NDT.

In some embodiments, the terminator node may additionally receive a respective predicate per thread, i.e., a Boolean value that specifies whether the branch is the actual exit point of the DFG or not. The terminator may receive the predicate in an input token. Since a DFG may have several exit points, in the multiple-exit case each exit point will typically be predicated. Per thread, only the actual exit point will receive a true predicate, and the other exit points will receive false predicates.

Upon receiving a final token, the terminator node updates all its active 64-bit bitmaps in the NDT (i.e., updates the NDT with the identities of the successor DFG of each completed thread). Once the NDT update is known to be complete, the terminator node notifies scheduler 44 of the completion by sending a final token. This reporting mechanism enables the scheduler to ensure that all terminators, of all the replicas of the present DFG, have completed executing their respective thread batches.

In an embodiment, instead of using final tokens, scheduler 44 counts the number of thread batches sent to the initiators (e.g., the number of bitmaps sent to the initiators) and compares this number to the number of completed thread batches reported by the terminators (e.g., to the number of bitmaps reported by the terminators). When the number of sent batches (e.g., bitmaps) equals the number of received batches (e.g., bitmaps), the scheduler concludes that execution of the present DFG is completed. At this stage, controller 32 may regard the program state as complete (fully defined), save the state, and switch to a new DFG (of the same program/user or of a different program/user).

Concurrent Execution of Multiple DFGs

In some embodiments of the present invention, fabric 24 of processor 20 is configured to concurrently execute instructions belonging to multiple different DFGs. The embodiments described below refer mainly to concurrent handling of two DFGs, for the sake of clarity. The disclosed techniques, however, can be used in a similar manner to handle a larger number of DFGs concurrently.

The different DFGs may belong to the same software program or to different programs or tasks, e.g., different database queries. Different programs or tasks may be associated with the same user or with different users. When different DFGs belong to the same software program or task, information such as NDT, live values, as well as buffers and cache content, may be shared. When different DFGs belong to different software programs or tasks, such information is typically maintained separately per program or task.

In the present context, the phrase "concurrent execution of code instructions specified in multiple different DFGs" refers to fabric 24 as a whole, and not necessarily to each individual CN 28 in the fabric. In some embodiments CNs 28 switch-over from one DFG to another gradually. In other embodiments, one or more CNs 28 alternate between execution of instructions specified in two or more different DFGs. All of these possibilities are regarded herein as concurrent execution of code instructions specified in multiple different DFGs.

Gradual DFG Switch-Over

In some embodiments, CNs 28 in fabric 24 switch-over from the current DFG to the next scheduled DFG gradually. For example, a given CN 28 may switch to the next DFG in response to detecting that it has completed its part in executing all the threads in the current thread set. Such CN-specific switch-over reduces the latency overhead incurred by initiating a new DFG.

In these embodiments, the switch-over from one DFG to the next is performed at different times for different CNs 28. Therefore, during a transition interval, some CNs will still execute instructions specified in the current DFG, while other CNs already execute instructions specified in the next DFG.

In the present context, the term "switch-over time" refers to the time at which the CN hardware (e.g., compute element, switch) is reconfigured in accordance with the next DFG. The configuration setting for the next DFG is typically provided to the CN in advance, and stored in the CN's shadow configuration registers.

In an example embodiment, as noted above, the initiator generates a final token after initiating the last batch of threads in the thread set. CNs 28 pass the final token from one to another through fabric 24, according to the data flow specified by the DFG, until reaching the terminator. In some cases, when the data flow splits into multiple paths and later merges, a given CN 28 will receive multiple final tokens. Each CN is aware of the number of final tokens that should pass through it, en route to the terminator. Thus, each CN 28 is able to verify whether it has completed its part in executing all the threads in the current thread set, by counting the final tokens passing through the CN.

In some embodiments, a given CN 28 detects that it has forwarded the last final token, and in response switches-over to the configuration of the next DFG. This detection and switch-over is typically independent of any other CN. When CNs 28 operate in this manner, the switch-over to the next DFG will typically occur gradually through fabric 24, with CNs closer to the initiator switching earlier, and CNs further away from the initiator switching later.

In such embodiments, the initiator may begin sending the threads to run on the next DFG via the fabric sooner, before all the CNs have switched over (i.e., while some of the CNs, closer to the terminator, are still busy executing the last threads of the previous DFG). As a result, the latency incurred by initiating the new DFG is reduced.

In one embodiment, once verifying that the last final token has passed, the auxiliary logic of the CN reconfigures all of the CN components (e.g., both the compute element and the switch) to the configuration of the next DFG. In other embodiments, the CN reconfigures only partially when some of the final tokens have passed, e.g., reconfigures only the compute element and part of the switch but not all of it. The remaining CN components are still reconfigured at the same time, e.g., once the last final token reaches the terminator.

Figure 4:
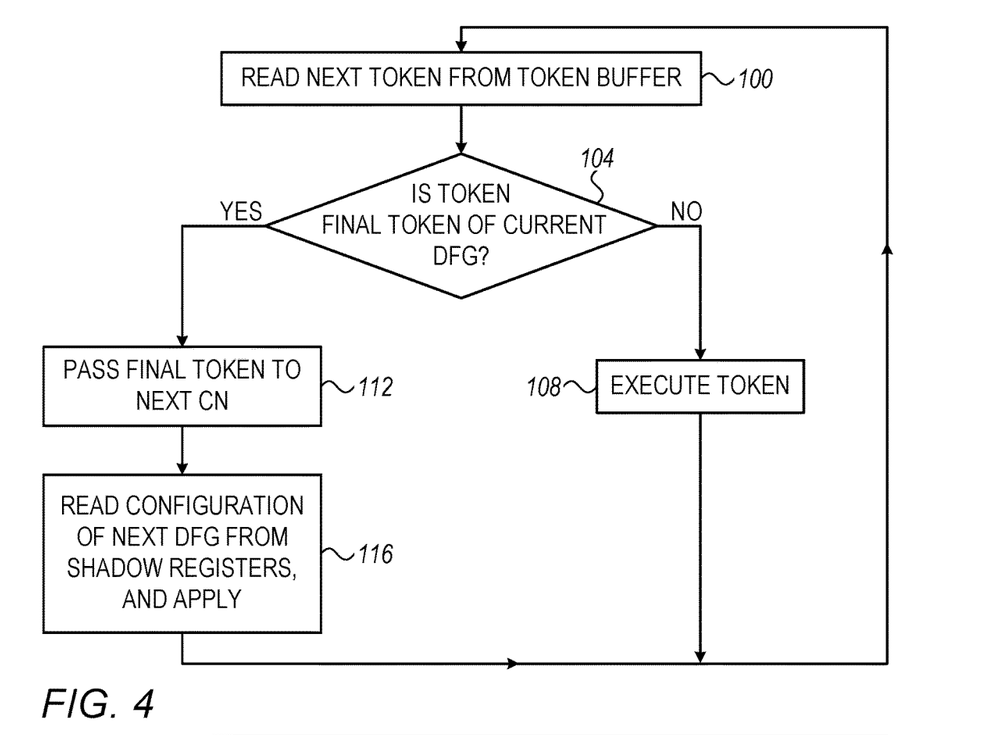
FIG. 4 is a flow chart that schematically illustrates a method for concurrent execution of multiple DFGs, in accordance with an embodiment of the present invention.

FIG. 4 is a flow chart that schematically illustrates a method for concurrent execution of multiple DFGs, in accordance with an embodiment of the present invention. The method is described from the perspective of an individual CN 28. Typically, different CNs 28 carry out this method independently of one another.

The method begins with the CN reading the next token from its token buffer, at a token readout step 100. At a checking step 104, the CN checks whether the token is the final token of the current DFG. (If the CN expects to receive N final tokens for the current DFG, the CN checks whether the token is the $N^{th}$ final token.)

If the token is not the final token (or not the $N^{th}$ final token, as applicable), the CN executes the token, at an execution step 108. The method then loops back to step 100 for reading the next token from the token buffer. (In the present context, the phrase "a CN executes a token" means that the CN applies the code instruction it is configured to execute in accordance with the applicable DFG, to an argument provided in the token.)

If the token is the final token (or the $N^{th}$ final token, as applicable), the CN passes the token to the next CN or CNs along the data flow of the current DFG, toward the terminator, at a token passing step 112. The CN then reads the configuration of the next DFG from the shadow registers, and applies the new configuration, at a CN reconfiguration step 116. The method then loops back to step 100 for reading the next token from the token buffer. At this stage, the next token will belong to the newly-configured DFG.

The flow of FIG. 4 is a simplified example flow that is depicted for the sake of clarity. In alternative embodiments, gradual switch-over from one DFG to another can be performed in any other suitable way.

In some embodiments, the switch-over time is determined entirely by each CN 28. In other embodiments, the switch-over is regulated, at least in part, by controller 32. For example, controller 32 may decide it is time to begin switching-over from the current DFG to the next DFG, and in response send a suitable control signal to CNs 28. In such an embodiment, each CN 28 switches-over to the next DFG after it has received both (i) the last final token for the current DFG, and (ii) the control signal from controller 32.

Typically, switching-over a CN 28 to a different DFG involves reconfiguration of various CN elements, e.g., compute element (64, 94) and switch (68, 88). Consider a CN that, in accordance with the current DFG, is configured to receive multiple final tokens via the switch. In one embodiment, the CN waits until the last final token has passed, and then reconfigures the switch in accordance with the next DFG. In an alternative embodiment, the CN attempts to partially-reconfigure the switch, to the extent possible, after passing every final token (not only the last final token).

In some embodiments, a CN that is not active in the next DFG may self-deactivate in response to detecting it has forwarded the last final token (or otherwise detecting it has completed its part in handling the current DFG). When using this technique, power consumption is reduced since CNs power-off independently of one another as soon as they determine they will not be used in the next DFG.

In some embodiments, controller 32 identifies CNs 28 that were inactive in the current DFG but need to be active in the next DFG, and activates them. Such CNs should be treated differently because, for example, they do not receive any final token of the current DFG. In one embodiment, controller 32 powers-on these DFGs once fabric 24 begins switching-over to the next DFG, e.g., upon sending the control signal that permits CNs 28 to switch-over when they are ready. In another embodiment, controller 32 powers-on these DFGs upon sending them the configuration of the next DFG.

In any of the above embodiments, activation and de-activation of a CN may be implemented in any suitable way, e.g., using clock gating or connection/disconnection of supply voltage.

In practice, it is possible that two DFGs that run concurrently on fabric 24 follow one another in the data-flow of the program. In such a case, controller 32 typically ensures that no thread will begin executing on the next DFG before it has completed execution (e.g., reached the terminator) in the current DFG. In one embodiment, this condition is guaranteed by resetting the NDT bits of the threads that execute on the current DFG, as explained above. Alternatively, any other suitable means can be used for this purpose.

As noted above, processor 32 may configure fabric 24 with multiple replicas of a certain DFG that run concurrently. In some embodiments, processor 32 configures the fabric with both multiple replicas of a certain DFG, and multiple different DFGs, all running concurrently. Generally, fabric 24 may concurrently execute any number of different DFGs, each of these DFGs having a single replica or any number of replicas.

Alternation Between DFG Configurations in CN

In some embodiments, at least some of CNs 28 in fabric 24 alternate between execution of instructions specified in two or more different DFGs. The alternation may be performed, for example, from one clock cycle to the next, or with any other suitable time granularity.

In order to alternate between N different DFGs, a CN 28 typically holds the N configurations of the N DFGs in its configuration registers. Controller 32 sends to the initiator (or initiators) thread batches associated with all the N DFGs being executed concurrently. The initiator typically sends each thread to the relevant CN or CNs, along with information that associates the thread with the DFG on which it should execute. Alternatively, information that associates each thread with the appropriate DFG may be provided to the CNs in any other suitable way.

Typically, a CN 28 may hold in its token buffer tokens belonging to various different DFGs. (As explained above, a token typically comprises an argument that is provided by a preceding CN in the DFG, to be used as an operand in the code instruction executed by the present CN.) The terms "threads" and "tokens" are sometimes used interchangeably. The CN may schedule the threads in accordance with any suitable scheduling criterion that serves the various DFGs. In one example embodiment, the CN performs Round-Robin scheduling among all the DFGs that have threads ready to execute. Alternatively, the CN may apply suitable priorities among the DFGs that have threads ready to execute.

In some embodiments, the alternation between DFGs is centralized, and is controlled by controller 32. In these embodiments, controller 32 typically instructs the various CNs synchronously, to switch to a specified DFG in a certain clock cycle, then to another specified DFG in the next clock cycle, and so on. In these embodiments, in a given cycle all the CNs execute the same DFG. Centralized control of this sort is relatively simple to implement, control and debug, but is sub-optimal in terms of performance.

In alternative embodiments, the alternation between DFGs is distributed, allowing each CN 28 autonomy in choosing the DFG it will execute in each cycle. For example, each CN 28 may comprise a separate token buffer per DFG, and a separate mechanism for coordinating the reception of tokens from preceding CNs per DFG. In the present context, separate regions in the same buffer are also considered to be separate token buffers for different DFGs. Allocation of the separate buffer spaces may be predefined or performed dynamically at runtime.

In one embodiment, per DFG, the CN sends a "ready" signal to the preceding CNs when it is ready to receive a new input token into the respective token buffer. (Note that the same CN 28 may receive input tokens from different preceding CNs for different DFGs, and send different output tokens to different CNs for different DFGs. Therefore, delivering a token typically involves reconfiguring both the switch of the CN sending the token and the switch of the CN receiving the token. The switch reconfiguration should therefore be coordinated between the two neighbor CNs, e.g., using the "ready" signal).

In other words, the CN carries multiple buffer population processes, e.g., using multiple separate hardware units. Each buffer population process corresponds to a respective DFG. Each buffer-population process interacts with the preceding CN or CNs, e.g., using a respective "ready" signal, and coordinates the transferal of input tokens from the preceding CN or CNs to the respective token buffer allocated to the respective DFG.

In parallel to of the buffer population processes, the CN autonomously schedules the alternation between DFGs using a suitable scheduling criterion. For example, the CN may perform Round-Robin scheduling among the DFGs having non-empty token buffers. Alternatively, the CN may apply suitable priorities among the DFGs having non-empty token buffers.

Figure 5:
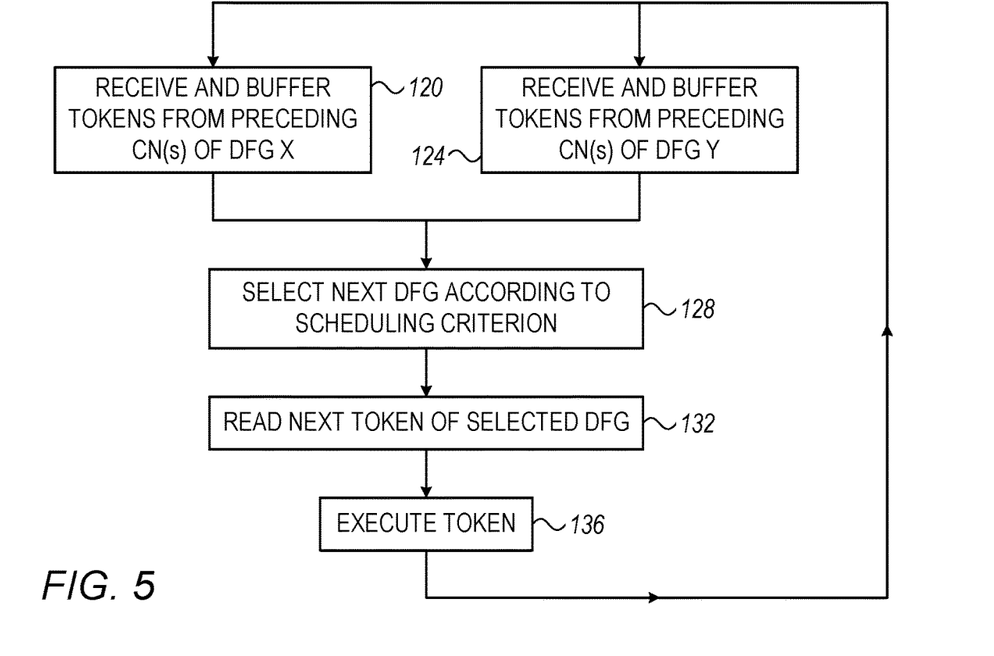
FIG. 5 is a flow chart that schematically illustrates a method for concurrent execution of multiple DFGs, in accordance with an alternative embodiment of the present invention.

FIG. 5 is a flow chart that schematically illustrates a method for concurrent execution of multiple DFGs, in accordance with an alternative embodiment of the present invention. The method is again described from the perspective of an individual CN 28. In this simplified example, the CN alternates between two DFGs denoted "DFG X" and "DFG Y".

The method begins with the CN receiving new tokens from the preceding CN (or CNs) of DFG X, and from the preceding CN (or CNs) of DFG Y, at token reception steps 120 and 124, respectively. The new tokens are buffered in the token buffers of the CN, separately per DFG.

At a scheduling step 128, the CN selects the DFG whose token will be executed in the next cycle. Any suitable scheduling criterion can be used for this purpose, e.g., Round-Robin scheduling or some prioritization among the non-empty token buffers.

At a token readout step 132, the CN reads a token from the token buffer of the selected DFG. At an execution step 136, the CN executes the read token. The method then loops back to steps 120 and 124 above. As noted above, the phrase "a CN executes a token" means that the CN applies the code instruction it is configured to execute in accordance with the applicable DFG, to an argument provided in the token.

The flow of FIG. 5 is a simplified example flow that is depicted for the sake of clarity. In alternative embodiments, alternation between DFGs can be performed in any other suitable way.

In these embodiments, too, it is possible that two DFGs that run concurrently on fabric 24 follow one another in the data-flow of the program. In such a case, controller 32 typically ensures that no thread will begin executing on the next DFG before it has completed execution (e.g., reached the terminator) in the current DFG. In one embodiment, this condition is guaranteed by resetting the NDT bits of the threads that execute on the current DFG, as explained above. Alternatively, any other suitable means can be used for this purpose.

In some embodiments, processor 32 configures the fabric with both multiple replicas of a certain DFG, and multiple different DFGs, all running concurrently. Generally, fabric 24 may concurrently execute any number of different DFGs, each of these DFGs having a single replica or any number of replicas.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A processor, comprising:
  a compute fabric, comprising an array of compute nodes and interconnects that configurably connect the compute nodes; and
  a controller, configured to:
    receive at least first and second different Data-Flow Graphs (DFGs), each specifying code instructions; and
    configure at least some of the compute nodes and interconnects in the compute fabric to concurrently execute the code instructions specified in the first and second DFGs, and send to the compute fabric multiple first threads that execute the code instructions specified in the first DFG and multiple second threads that execute the code instructions specified in the second DFG, thereby causing the compute fabric to execute, at least during a given time interval, both code instructions specified in the first DFG and code instructions specified in the second DFG.

2. The processor according to claim 1, wherein, at least in a given clock cycle of the compute fabric, one or more compute nodes execute code instructions specified in the first DFG and one or more other compute nodes execute code instructions specified in the second DFG.

3. The processor according to claim 1, wherein, at least during the given time interval, one or more of the compute nodes switch from execution of code instructions specified in the first DFG to execution of code instructions specified in the second DFG.

4. The processor according to claim 1, wherein a first compute node in the compute fabric is configured to switch-over from the first DFG to the second DFG at a first time, and a second compute node in the compute fabric is configured to switch-over from the first DFG to the second DFG at a second time, different from the first time.

5. The processor according to claim 1, wherein a given compute node is configured to switch-over from the first DFG to the second DFG in response to completing processing all the threads associated with the first DFG.

6. The processor according to claim 1, wherein the controller is configured to send to one or more of the compute nodes a control signal that permits the compute nodes to switch-over from the first DFG to the second DFG, and wherein a given compute node in the compute fabric is configured to switch-over from the first DFG to the second DFG not before receiving the control signal.

7. The processor according to claim 1, wherein a given compute node, which participates in executing the code instructions specified in the first DFG but does not participate in executing the code instructions specified in the second DFG, is configured to self-deactivate in response to completing processing all the threads associated with the first DFG.

8. The processor according to claim 1, wherein the controller is configured to activate a given compute node, which does not participate in executing the code instructions specified in the first DFG but participates in executing the code instructions specified in the second DFG.

9. The processor according to claim 1, wherein the controller is configured to instruct the compute nodes synchronously to alternate between at least the first and second DFGs.

10. The processor according to claim 1, wherein a given compute node is configured to autonomously schedule alternation between at least the first and second DFGs.

11. The processor according to claim 10, wherein the given compute node is configured to:
receive first input tokens by communicating with one or more first compute nodes that precede the given compute node in accordance with the first DFG;
receive second input tokens by communicating with one or more second compute nodes that precede the given compute node in accordance with the second DFG; and
execute the first input tokens and the second input tokens in accordance with the scheduled alternation between the first and second DFGs.

12. A computing method, comprising:
in a processor that includes a compute fabric comprising an array of compute nodes and interconnects that configurably connect the compute nodes, receiving at least first and second different Data-Flow Graphs (DFGs), each specifying code instructions; and
configuring at least some of the compute nodes and interconnects in the compute fabric to concurrently execute the code instructions specified in the first and second DFGs, and sending to the compute fabric multiple first threads that execute the code instructions specified in the first DFG and multiple second threads that execute the code instructions specified in the second DFG, thereby causing the compute fabric to execute, at least during a given time interval, both code instructions specified in the first DFG and code instructions specified in the second DFG.

13. The method according to claim 12, wherein configuring the compute fabric comprises, at least in a given clock cycle of the compute fabric, causing one or more compute nodes to execute code instructions specified in the first DFG, and causing one or more other compute nodes to execute code instructions specified in the second DFG.

14. The method according to claim 12, wherein configuring the compute fabric comprises, at least during the given time interval, causing one or more of the compute nodes to switch from execution of code instructions specified in the first DFG to execution of code instructions specified in the second DFG.

15. The method according to claim 12, wherein configuring the compute fabric comprises causing a first compute node in the compute fabric to switch-over from the first DFG to the second DFG at a first time, and a second compute node in the compute fabric to switch-over from the first DFG to the second DFG at a second time, different from the first time.

16. The method according to claim 12, wherein configuring the compute fabric comprises, in a given compute node, switching-over from the first DFG to the second DFG in response to completing processing all the threads associated with the first DFG.

17. The method according to claim 12, wherein configuring the compute fabric comprises sending to one or more of the compute nodes a control signal that permits the compute nodes to switch-over from the first DFG to the second DFG, and, in a given compute node in the compute fabric, switching-over from the first DFG to the second DFG not before receiving the control signal.

18. The method according to claim 12, and comprising self-deactivating a given compute node, which participates in executing the code instructions specified in the first DFG but does not participate in executing the code instructions specified in the second DFG, in response to completing processing all the threads associated with the first DFG.

19. The method according to claim 12, wherein configuring the compute fabric comprises activating a given compute node, which does not participate in executing the code instructions specified in the first DFG but participates in executing the code instructions specified in the second DFG.

20. The method according to claim 12, wherein configuring the compute fabric comprises instructing the compute nodes synchronously to alternate between at least the first and second DFGs.

21. The method according to claim 12, and comprising, in a given compute node, autonomously scheduling alternation between at least the first and second DFGs.

22. The method according to claim 21, wherein scheduling the alternation comprises performing, in the given compute node:
receiving first input tokens by communicating with one or more first compute nodes that precede the given compute node in accordance with the first DFG;
receiving second input tokens by communicating with one or more second compute nodes that precede the given compute node in accordance with the second DFG; and
executing the first input tokens and the second input tokens in accordance with the scheduled alternation between the first and second DFGs.

* * * * *